Patented June 17, 1941

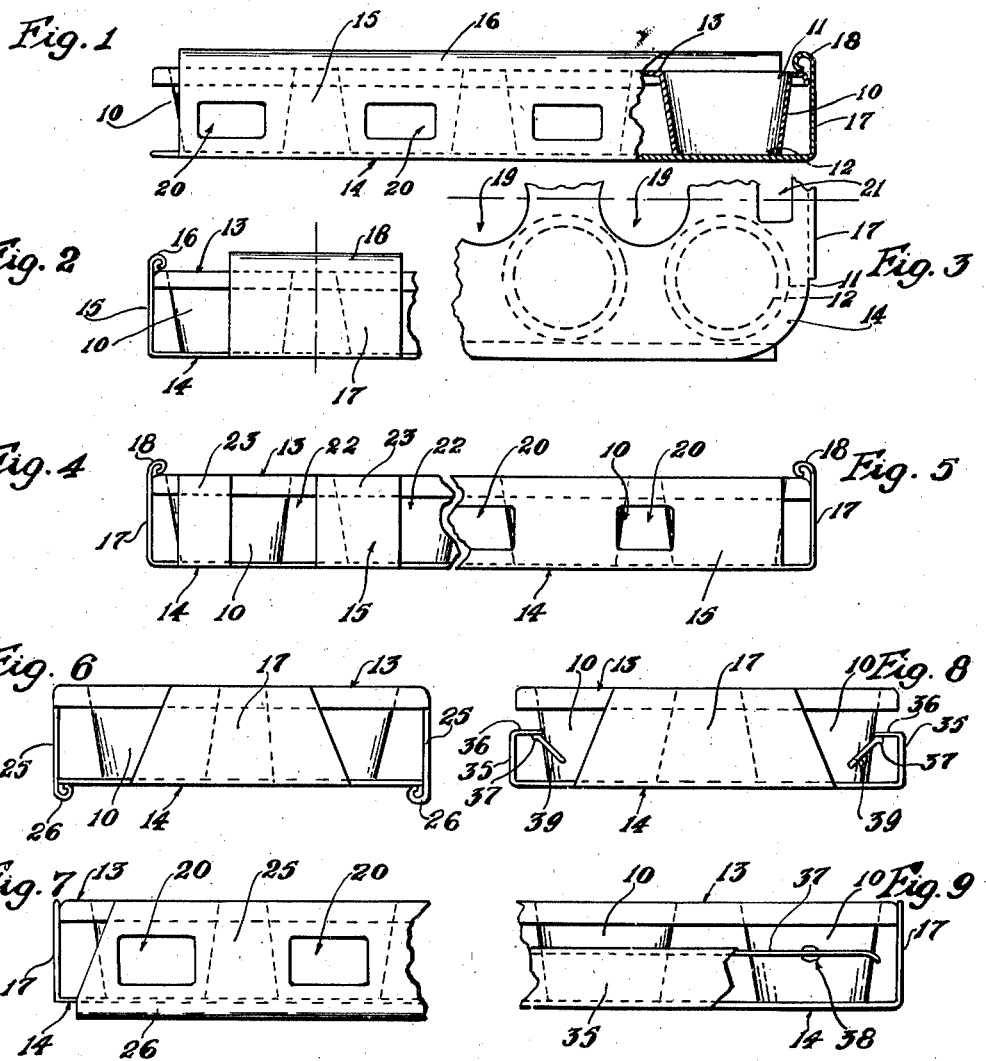

2,246,334

UNITED STATES PATENT OFFICE 2,246,334

BAKING PAN

Van Lear Woodward, Staten Island, N. Y.

Application April 19, 1939, Serial No. 268,735

10 Claims. (Cl. 53—6)

The present invention relates to baking pans such as those known as "muffin tins" characterized by the provision in each of a plurality of small open cups in which cup cakes, muffins and the like may be baked.

A general object of the invention is the provision of such a baking pan in which the cups and associated structure are of such construction as to facilitate efficient use in baking and cleaning and assure economy in manufacture.

A more specific object of the invention is the provision of such a baking pan which is readily and cheaply constructed characterized by an assembly of cup walls completely open at both the top and bottom ends thereof to permit efficient cleaning in an easy manner, the open cup bottoms being effectively closed for efficient use in baking by a readily removable plate which when demounted from the pan in a simple manner is likewise easily cleaned.

A further object of the invention is the provision of such a baking pan wherein the bottoms of the cups are formed by a readily removable bottom plate of a dimension such as to close effectively the bottom ends of the cup walls.

Another object is the provision in such a baking pan of suitably arranged apertures in bottom plate structure, supporting flanges and the like which permits free and effective circulation of hot air around the cup walls during baking.

An additional object of the invention is the provision in such a baking pan comprising a unit including a plurality of cup walls open at the bottom ends thereof and a removable bottom plate unit for effectively closing the open bottoms of the cups, of flanges on one of the two units which extend toward the other unit removably to engage structure of the latter effectively to hold the parts together while permitting ready separation for easy cleaning.

Other objects of the invention will in part be obvious and will in part appear hereinafter.

The invention accordingly comprises an article of manufacture possessing the features, properties, and the relation of elements which will be exemplified in the article hereinafter described and the scope of the invention will be indicated in the claims.

For a fuller understanding of the nature and objects of the invention reference should be had to the following detailed description taken in connection with the accompanying drawing, in which:

Fig. 1 is a side elevational view with parts broken away and in section of a baking pan embodying features of the present invention;

Figs. 2 and 3 are respectively an end elevational view and a bottom plan view, with parts broken away, of the pan shown in Fig. 1;

Figs. 4 and 5 are side elevational views with parts broken away of modified forms of the pan shown in Fig. 1;

Figs. 6 and 8 are end elevational views of modified forms of the invention and show alternative ways of demountably securing in position various forms of bottom plates; and Figs. 7 and 9 are side elevational views, with parts broken away, of the pan structures respectively shown in Figs. 6 and 8.

Prior to the present invention "muffin tins" and the like have commonly been constructed as rigid structures formed of sheet metal, each including a relatively flat top plate having holes therein arranged at uniform intervals into which are rigidly anchored the open top ends of cup side walls which usually slope upwardly to substantially flat bottoms of smaller dimensions than the open tops. Despite the fact that the side walls may be sloping to facilitate removal of baked products and subsequent cleaning, such operations have been found to be difficult and annoying to perform effectively.

These and other difficulties attendant upon the use and manufacture of such types of baking pans are efficiently eliminated by the practice of the present invention. In accordance therewith the bottoms of the cups are made completely open and free from any obstructions which might tend to interfere with ready cleaning. There is thus eliminated all recesses and sharp angles inside the cups which tend to prevent ready removal of material and easy cleaning. Since the bottoms are completely open and free from obstruction permitting movement of a cleaning member such as a wadded cloth over the entire areas of the inner surfaces of the side walls and therebeyond through the open bottoms, the inner surfaces of the side walls can be completely, quickly and easily cleaned. The open cup bottoms are effectively closed for use of the pan in baking by a plate of such dimension as to cover completely and effectively to close the bottom ends of the cup walls. The bottom plate is removably secured in position by any simple and suitable means permitting ready demountation of the bottom plate, and is likewise so constructed as to facilitate cleaning thereof. The structures of the baking pans of the invention and the parts thereof are of a nature as to assure economy of production, particularly on a commercial scale.

These advantages and others will be more apparent from the following descriptions of various typical modifications, taken in connection with the accompanying drawing wherein like numerals refer to like parts throughout. In the baking pan structure shown in Figs. 1, 2 and 3, preferably formed of any suitable sheet metal, a plurality of cup walls 10—10, preferably tapered as shown, and completely open at both the top ends 11—11 and bottom ends 12—12 thereof, are anchored at their top ends to a top plate 13 in any suitable manner such as by beading (not shown) or by being made integral therewith. Since the cup unit including the plurality of cup walls is constructed with the bottom ends of the cups open it has been found to be economically feasible to die out by suitable operations the top plate 13 and the plurality of cup walls 10—10 from a single plate. A bottom plate 14 is suitably formed from a flat plate of such dimensions as to cover completely and effectively to close the open bottom ends 12—12 of the cup walls when in assembled position as shown. On opposite sides of the bottom plate 14 the edges are turned up to form side flanges 15, 15 and their edges may be turned over to form beads 16, 16. A similar flange 17 is formed on one end of the bottom plate 14 with its edge turned over to form a bead 18. The beads 16, 16 and 18 engage above the top plate 13 to hold the bottom plate 14 in position.

The bottom plate unit of such structure may be assembled with the cup unit, the latter comprising a plurality of cups having open bottoms anchored to the top plate, by engaging one end of the cup unit in the right hand end of the bottom plate unit with beads 16, 16 engaging above the top plate 13 and then telescoping the two units relative to each other with the side flanges 15, 15 serving as guides for the cup unit and the top plate 13 sliding beneath the beads 16, 16. Such telescoping action is limited by the end flange 17 which serves as a stop when the structure is completely assembled.

As shown in Fig. 3 the bottom plate may be provided with a plurality of apertures 19—19 intermediate areas engaging the bottom ends 12—12 of the cup walls 10—10. In addition suitable apertures 20—20 may be formed in the side flanges 15, 15. These apertures together permit free circulation of hot air around the cup walls 10—10 during baking operations. The apertures 19—19 and 20—20 and the edges thereof are preferably so shaped as to avoid interference with cleaning operations. An additional aperture 21 may be provided in the bottom plate 14 adjacent the flange 17 to serve as a finger hole, in addition to permitting free circulation of air, to facilitate sliding separation of the cup unit and the bottom plate unit.

It will be understood that if the side and end flanges 15, 15 and 17 are sufficiently resilient and the beads 16, 16 and 18 are of such dimension as to engage the top plate 13 relatively close to the edges thereof that the cup unit and the bottom plate unit may be assembled together by placing the cup unit above the bottom plate unit and snapping it into position. Inherent resiliency of the flanges 15, 15 and 17 permits sufficient movement thereof to allow the edges of the top plate 13 to slip past the beads 16, 16 and 18 until the cup unit is in position when the beads will snap over the edges thereof to hold the parts together.

A structure which is more readily adapted to this latter method of assembly is shown in Figs. 4 and 5 wherein the side flanges 15, 15 do not have their edges beaded but merely lie closely adjacent the edges of the top plate 13. In such structures the bottom plate 14 is provided on both ends with end flanges 17, 17 each having a bead 18 adapted to engage above the edge of a top plate 13. With such a structure it is an easy matter to remove the bottom plate from the cup unit by turning the unit bottom side up, grasping the opposite ends of the bottom plate in both hands, pulling against the beads 18, 18 with the index fingers to spread the beads apart and thereby permitting the cup unit to fall away from the bottom plate unit.

As shown in Fig. 4 the side flanges 15, 15 may be entirely cut away at intervals 22—22 to leave spaced apart upright members 23—23 to engage the side edges of the top plate 13, or alternatively suitable apertures 20—20 may be formed in the side flanges 15, 15, to provide the desired passages for free circulation of air around the cup walls.

In Figs. 6 and 7 are shown alternative means for securing the bottom plate unit to the cup unit wherein side flanges 25, 25 are made integral with the edges of the top plate 13, these side flanges being provided with beads 26, 26 on their free edges adapted to engage below the bottom plate 14 in a manner similar to the engagement of the beads 16, 16 over the top of plate 13 in the structures shown in Figs. 1 to 5 inclusive. As in the structure shown in Fig. 1 the bottom plate 14 may be provided with an end flange 17 adapted to engage the end of the top plate 13 to serve as a stop. Obviously with such a structure the bottom plate may be mounted by sliding it in longitudinally between the bottom ends of the cup walls 10—10 and the beads 26, 26 or may be snapped into position by flexing the side flanges 25, 25. The bottom plate 14 may be more readily snapped into position if it is provided at its sides with rounded edges or beads to engage with the rounded surfaces of the beads 26, 26.

In the structure shown in Figs. 8 and 9 the bottom plate 14 is secured in position by side flanges 35, 35 bent at their edges to form lips 36, 36 which engage above elongated members 37, 37 such as wires, fastened to the outer surfaces of the cup walls 10—10 in any suitable manner such as by spot welding or soldering as at 38—38. The ends of the wires 37, 37 are preferably bent downwardly at their ends 39, 39 so as to facilitate engagement thereover of the lips 36, 36 when it is desired to assemble the bottom plate unit 14 with the cup unit. Obviously, as in the structure shown in Figs. 6 and 7, the bottom plate may be snapped into position if flanges 35, 35 are suitably spread to permit the lips 36, 36 to engage past the wires 37, 37 and to facilitate such action the lip members 36, 36 may be beaded. An end flange 17 may be provided on the bottom plate 14 to serve as a stop.

It will be understood that in the structures shown in Figs. 6 to 9 inclusive side flanges may be constructed as shown or be provided with suitable apertures to permit free circulation of air or may be entirely cut away at intervals as in the structure shown in Fig. 4.

It will thus be seen that the objects set forth above are efficiently attained by the practice of the present invention, particularly since the parts of the device are capable of production on a commercial scale by simple stamping and dieing operations and the parts of the structure resulting therefrom are readily assembled and dismounted by the simplest of operations which permits effective and easy cleaning of the parts.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A baking pan comprising a plurality of cup walls completely open at both ends and having their inner surfaces free from recesses and sharp angles, said walls being rigidly mounted relative to each other, a bottom closure plate of such dimension as to cover completely the bottom ends of the cup walls when in position, and means removably to secure said plate to said cup walls in closing position.

2. A baking pan comprising a cup unit including a plurality of cup walls completely open at both ends and having their inner surfaces free from recesses and sharp angles, and a top plate rigidly supporting said cup walls with their ends open, a removable bottom closure plate unit completely covering the bottom ends of said cup walls, and means on one of said units removably to engage the other unit to hold them together.

3. The structure defined in claim 2 characterized by the provision of apertures in the bottom plate intermediate areas engaging the bottom ends of the cup walls to permit free circulation of hot air around the cup walls.

4. A baking pan comprising a cup unit including a plurality of cup walls completely open at both ends and a top plate rigidly supporting said cup walls with their upper ends open, a removable bottom closure plate unit completely covering the bottom ends of said cup walls, and flanges on one of said units extending along sides of said cup walls removably engaging the other unit to hold the units together.

5. The structure defined in claim 4 characterized by the provision of apertures in the bottom plate intermediate areas engaging the bottom ends of the cup walls and in the flanges to permit free circulation of hot air around the cup walls.

6. A baking pan comprising a cup unit including a plurality of cup walls completely open at both ends and a top plate rigidly supporting said cup walls with their upper ends open, a removable bottom closure plate unit completely covering the bottom ends of said cup walls, and flanges extending from edges of said bottom plate along sides of said cup walls and removably engaging the cup unit to hold the units together.

7. A baking pan comprising a cup unit including a plurality of cup walls completely open at both ends and a top plate rigidly supporting said cup walls with their upper ends open, a removable bottom closure plate unit completely covering the bottom ends of said cup walls, and flanges extending from edges of the top plate removably engaging the bottom plate to hold the units together.

8. A baking pan comprising a cup unit including a plurality of cup walls completely open at both ends and a top plate rigidly supporting said cup walls with their upper ends open, a removable bottom closure plate unit completely covering the bottom ends of said cup walls, and flanges extending from edges of said bottom plate along sides of said cup walls and terminating in beads removably engaging the top plate to hold the units together.

9. A baking pan comprising a plurality of cup walls completely open at both ends, a top plate rigidly supporting said cup walls with their upper ends open, a removable bottom closure plate completely covering the bottom ends of said cup walls, and flanges extending from one end and the two side edges of the bottom plate along sides of said cup walls and terminating in beads removably engaging edges of the top plate to hold the bottom plate in position, said flanges and said bottom plate intermediate areas engaging the bottom ends of the cup walls being provided with apertures to permit free circulation of hot air around the cup walls.

10. A baking pan comprising a plurality of cup walls completely open at both ends, a top plate rigidly supporting said cup walls with their upper ends open, a removable bottom closure plate completely covering the bottom ends of said cup walls, elongated members extending between and secured to the outer surfaces of the cup walls on opposite sides thereof, and flanges extending from the side edges of said bottom plate removably engaging said members to hold the bottom plate in position.

VAN LEAR WOODWARD.

CERTIFICATE OF CORRECTION.

Patent No. 2,246,334. June 17, 1941.

VAN LEAR WOODWARD.

It is hereby certified that error appears in the printed specification of the above numbered patent requiring correction as follows: Page 1, second column, line 22, for the word "upwardly" read --inwardly--; and that the said Letters Patent should be read with this correction therein that the same may conform to the record of the case in the Patent Office.

Signed and sealed this 15th day of July, A. D. 1941.

(Seal)

Henry Van Arsdale,
Acting Commissioner of Patents.